United States Patent [19]
Föhl

[11] Patent Number: 5,242,213
[45] Date of Patent: Sep. 7, 1993

[54] SAFETY BELT RESTRAINING SYSTEM FOR VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 791,099

[22] Filed: Nov. 12, 1991

[30] Foreign Application Priority Data

Nov. 26, 1990 [EP] European Pat. Off. ........ 90122567.2

[51] Int. Cl.⁵ ............................................. A62B 35/00
[52] U.S. Cl. .................................... 297/472; 297/476; 297/478
[58] Field of Search ............... 297/472, 471, 470, 475, 297/476, 479, 478; 280/801, 805, 806, 807, 808; 242/107.4 A, 107.4 B, 107.2

[56] References Cited

U.S. PATENT DOCUMENTS

| | | | |
|---|---|---|---|
| 4,128,261 | 12/1978 | Paitula | 297/478 |
| 4,208,770 | 6/1980 | Takada | 297/476 X |
| 4,378,915 | 4/1983 | Fohl | 297/478 X |
| 4,394,034 | 7/1983 | Murphy et al. | 297/476 X |
| 4,422,594 | 12/1983 | Honl | 297/478 X |
| 4,438,551 | 3/1984 | Imar | 297/478 X |
| 4,492,348 | 1/1985 | Ziv et al. | 297/478 X |
| 4,687,253 | 8/1987 | Ernst et al. | 297/478 |
| 5,071,194 | 12/1991 | Fohl | 297/478 |
| 5,154,368 | 10/1992 | Fujimura et al. | 297/472 X |

Primary Examiner—Laurie K. Cranmer
Attorney, Agent, or Firm—Tarolli, Sundheim & Covell

[57] ABSTRACT

The safety belt restraining system for vehicles is provided with a vehicle-sensitive and/or webbing-sensitive locking belt retractor and a webbing clamping means following said retractor. To achieve fast activation of the webbing clamping means with minimum webbing withdrawal but nevertheless to protect the webbing from damage by the clamping operation, the inhibiting force exerted by the webbing clamping means on the webbing is limited by dimensioning and configuration of the system to a predetermined value at which the webbing clamping means does not cause any appreciable weakening of the webbing. The belt retractor is in turn dimensioned at least for absorbing the forces which are to be expected in the evolution of an accident and are introduced via the webbing after the predetermined value is exceeded. When said value is exceeded and, e.g. the webbing slips between the webbing clamping means, the retractor can absorb the remaining blocking load.

15 Claims, 4 Drawing Sheets

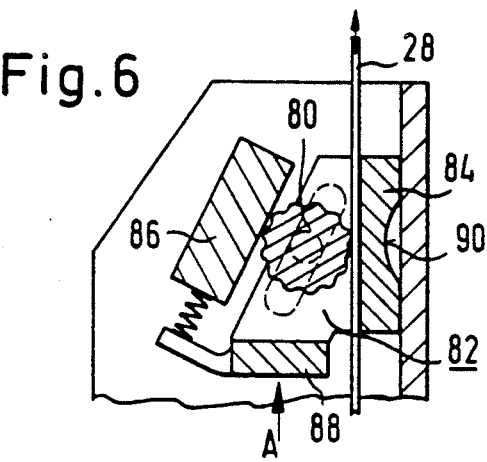
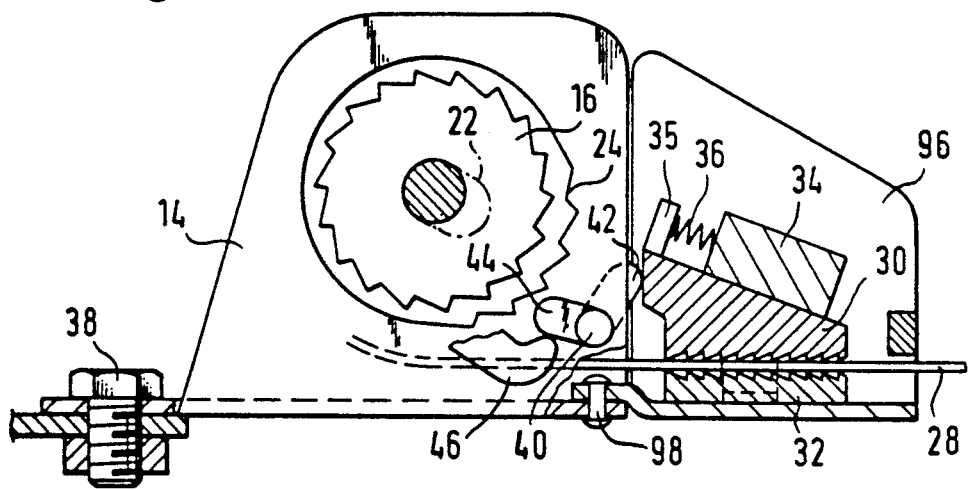
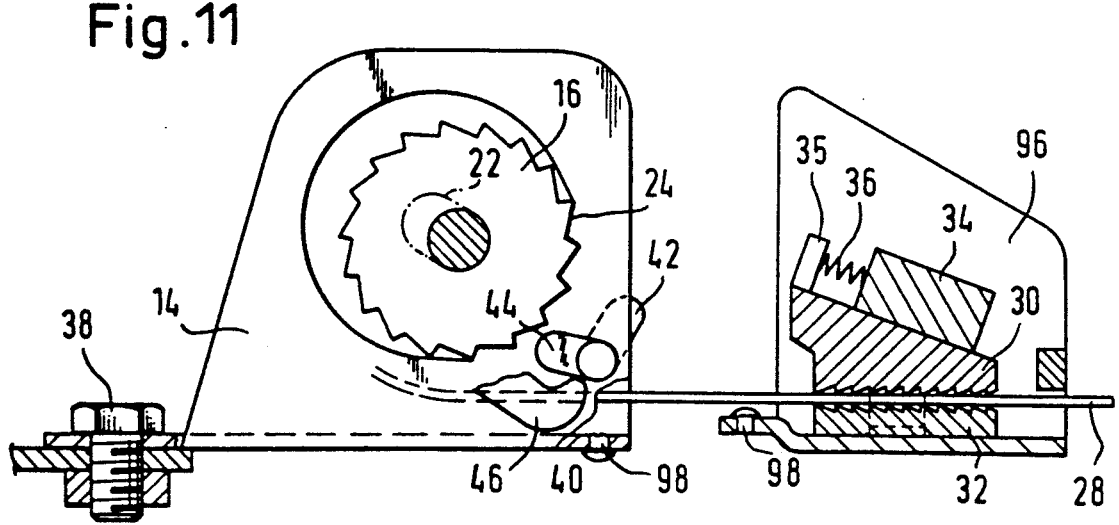

SAFETY BELT RESTRAINING SYSTEM FOR VEHICLES

The invention relates to a safety belt restraining system for vehicles comprising a vehicle-sensitive and/or webbing-sensitive locking belt retractor and a webbing clamping means following said retractor.

In such systems the purpose of the webbing clamping means, with a vehicle-sensitively or webbing-sensitively initiated blocking of the belt retractor, is to eliminate the film-reel effect which in conventional belt retractors is the cause of the withdrawal of a few centimetres of webbing length by tightening of the webbing coil after blocking of the belt reel. The webbing clamping means also relieves the belt retractor so that the latter in practice is dimensioned for small mechanical loads.

Webbing clamping means are being used to an increasing extent because they minimize the forward motion of the vehicle occupant in a vehicle collision by ensuring that after the blocking of the belt retractor no or only little further webbing can be withdrawn from the belt retractor. However, the clamping effect which can be achieved is limited because with increasing tensile force the pressure forces directed onto the webbing become correspondingly greater and can cause damage to the fabric structure of the webbing. A damaged webbing is likely to be ruptured under moderate tensile load.

The present invention provides a safety belt restraining system for vehicles in which the blocking function performed by the webbing clamping means is effected only up to a predetermined value of the tensile stress in the webbing; this value is chosen so that any possible risk of any damage at all to the webbing is avoided. When the tensile load in the webbing increases further the belt retractor takes over the blocking function. The belt retractor is therefore dimensioned for taking up the forces to be expected in an accident process which are introduced via the webbing and exceed the predetermined value. On reaching the predetermined value a certain webbing length may be withdrawn until the blocking action of the belt retractor has occurred. This effect, however, is perfectly desirable because it results in a dampening of load peaks. The predetermined value to which the clamping action of the webbing clamping means is limited lies in a range from about 6000N to 12000N. This value depends firstly on the nature of the clamping faces because they have the greatest influence on the danger of damage to the webbing, and secondly on the installation position of the clamping means because webbing deflections affect the loadability of the webbing.

The limitation of the clamping effect to the predetermined value of the tensile force in the webbing can be achieved in various manners. A first embodiment resides in that the pressure application forces of the clamping elements directed perpendicularly to the webbing surface are limited. On reaching the predetermined value the webbing then slips through between the clamping faces. In another embodiment a roller-like clamping element is used. Such a clamping element is advantageous in so far as it responds very rapidly and after the clamping has been effected can also be easily released. At the same time, the clamping effect which can be achieved with a roller-like clamping element is fundamentally limited to moderate tensile forces in the webbing; under high tensile forces the webbing tends to slip through in any case.

A particularly expedient embodiment resides in that the belt retractor and the webbing clamping means are connected together by connecting means which on reaching the predetermined value yield with plastic deformation and permit a limited movement of the webbing clamping means away from the belt retractor. This moving away of the webbing clamping means from the belt retractor with simultaneous plastic deformation of the connecting means is utilized to reduce load peaks in the belt system.

For the safety belt restraining system according to the invention in particular belt retractors can be used which operate with an indirect vehicle-sensitive and/or webbing-sensitive control of the blocking function. Such systems respond very rapidly so that on reaching a predetermined value of the vehicle retardation until occurrence of the belt reel blocking utilized for activation of the webbing clamping means hardly any webbing is withdrawn. This belt reel blocking is however used only to activate the webbing clamping means. With increasing loading of the belt retractor, after the predetermined value to which the effect of the webbing clamping means is limited has been reached, the load-bearing blocking mechanism of the belt retractor is activated. Particularly expedient are embodiments in which the belt reel is mounted radially yieldably and provided with a blocking toothing which cooperates with a corresponding blocking toothing on the housing of the belt retractor. With increasing load on the belt retractor, the belt reel, being vehicle-sensitively or webbing-sensitively blocked, is then displaced in radial direction until its blocking toothing is in engagement with the corresponding blocking toothing of the belt retractor. Any further webbing withdrawal due to the film-reel effect is not only harmless but even desirable because it results in a diminishing of load peaks in the belt system.

Further features and advantages of the invention will be apparent from the following description of several embodiments and from the drawings to which reference is made and in which:

FIG. 6 is a schematic partial longitudinal section of a particular embodiment of a webbing clamping means;

FIG. 10 shows another embodiment in perspective view before the occurrence of a high load; and FIG. 11 shows the embodiment illustrated in FIG. 10 after the occurrence of a high load.

Figure 1:
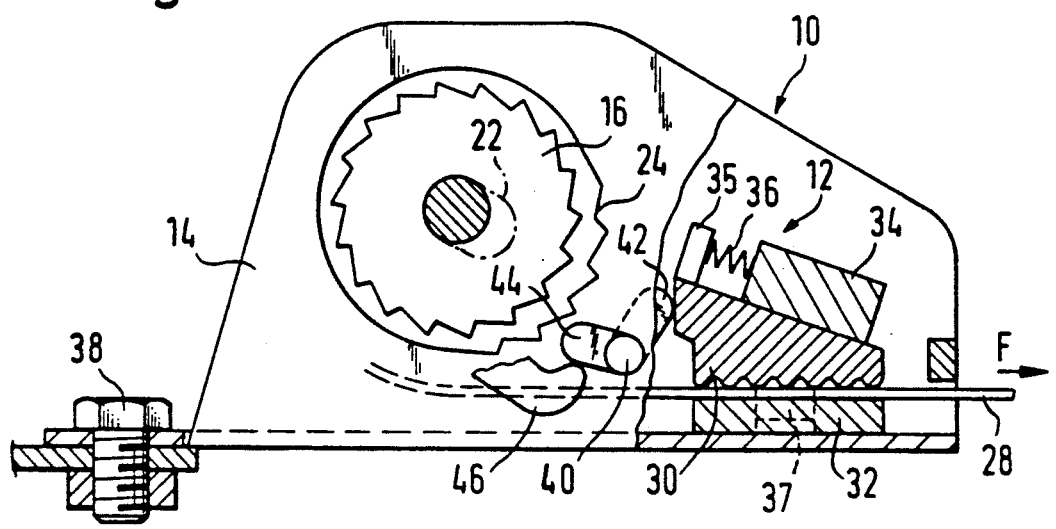
FIG. 1 shows a schematic side elevation, shown partially in section, of an embodiment of a belt retractor with following webbing clamping means in the state when the clamping action is starting.
Figure 2:
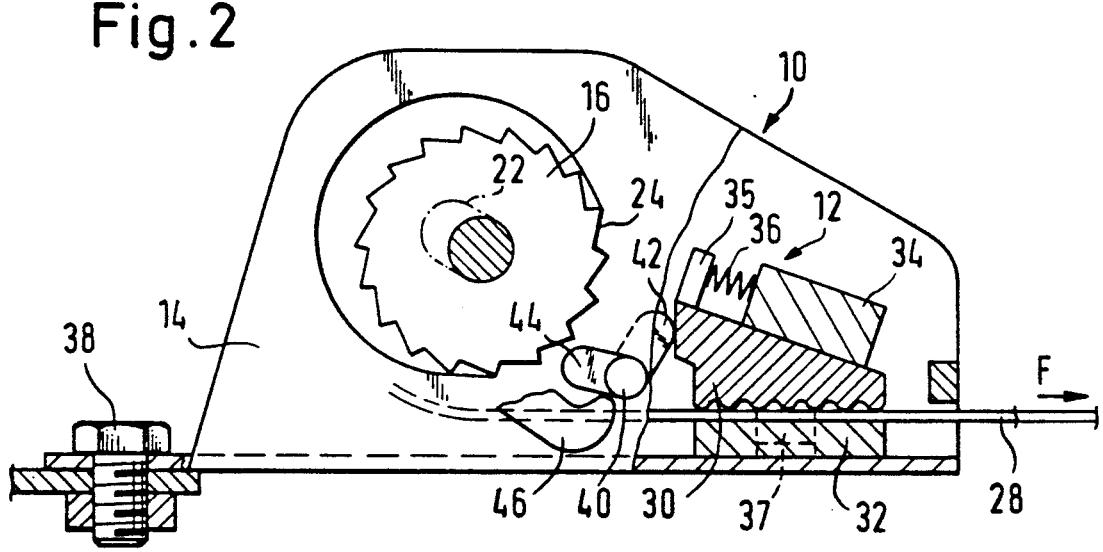
FIG. 2 shows the same view as FIG. 1 but in the state of high tensile load.
Figure 3:
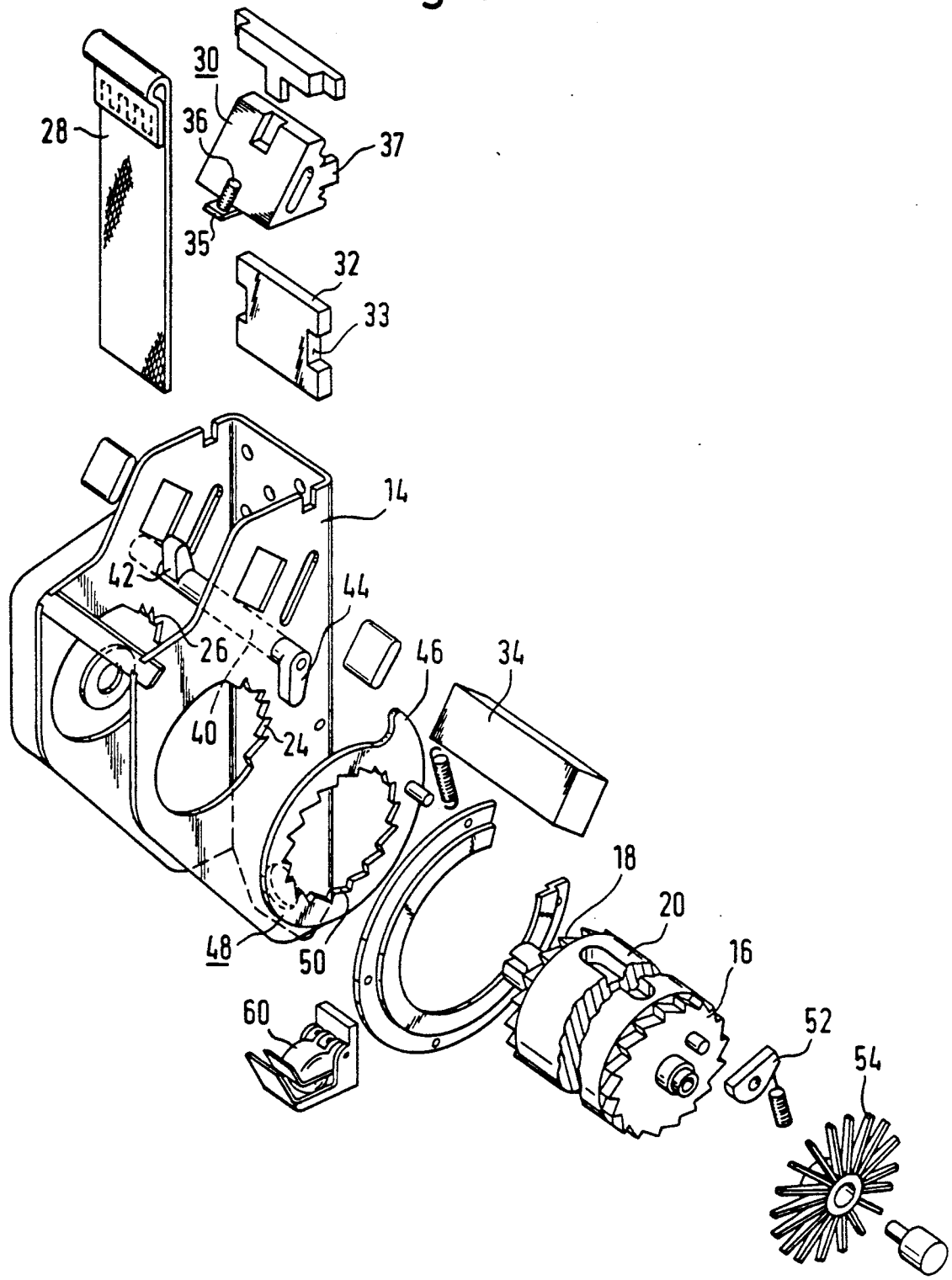
FIG. 3 is an exploded perspective view of the system shown in FIGS. 1 and 2.

In the embodiment shown in FIGS. 1 to 3 a belt retractor denoted generally by 10 and a webbing clamping means denoted generally by 12 are arranged in a common housing 14 of U-shaped cross-section. The belt reel 20 provided with laterally integrally formed blocking gears 16, 18 is mounted radially yieldably for example in slots 22 of the side legs of the housing 14. The blocking gears 16, 18 cooperate in known manner with a blocking toothing 24, 26 which are arranged in openings of the side legs of the housing 14. The webbing 28 running off the belt reel 20 is guided through the cooperating clamping elements of the webbing clamping means 12 following the belt retractor 10. Said clamping elements consist of a wedge-shaped clamping shoe 30 and a clamping plate 32 opposite said shoe. The clamping plate 32 is mounted displaceably in the longitudinal direction of the webbing 28 and via lugs 37 of the clamping shoe 30 engaging in lateral recesses 33 is in force-locking connection with said shoe. The clamping shoe 30 bears on its ramp face opposite the webbing 28 on a web-like support element 34 which is secured in corresponding recesses of the side legs of the housing 14. In the embodiment shown in FIGS. 1 and 2 the clamping shoe is biased into a rest position remote from the webbing 28 by a pressure spring 36 supported between a lug 35 of said shoe and the support element 34. The clamping shoe 30 is provided on its clamping surface facing the webbing 28 with a corrugated surface configuration which is gentle to the webbing but assists the force engagement. The housing 14 is secured by means of a pin 38 to the vehicle bodywork. Activation of the webbing clamping means 12 is via a two-armed lever which is pivotally mounted by means of a shaft 40 between the side legs of the housing 14 and the first lever arm 42 of which bears on an end face of the clamping shoe 30, the other lever 44 thereof being subjectable to the action of an actuating lug 46 on a control ring 48. Said control ring 48 is provided with an inner toothing 50 and surrounds a control pawl 52 which is pivotally mounted at the side of the blocking gear 16. A control disc 54 toothed in star-manner is also rotatably mounted on said blocking gear 16. Said control disc 54 comprises in known manner a control cam which engages the control pawl 52 to drive the latter when required into the control toothing 50 of the control ring 48. The control ring 48 is then coupled non-rotatably to the belt reel 20 so that webbing withdrawal leads to rotation of the control ring 48, the actuating lug 46 of which then acts on the clamping shoe 30 via the lever arms 42, 44 so that said shoe is pressed against the webbing 28. The control pawl 52 is driven into the control toothing 50 when the control gear 54 is stopped due to its mass inertia by means of a vehicle-sensitive sensor 60 or in webbing-sensitive manner and lags behind the rotation of the belt reel 20. This indirect driving principle is known and will therefore not be described in detail.

As long as the webbing 28 is blocked by the webbing clamping means 12, the belt retractor 10 remains in the state shown in FIG. 1. The webbing clamping means 12 is however so constructed that from a predetermined value of the belt tension onwards, indicated in FIG. 1 by the arrow F and having an order of magnitude of about 6000N to 12000N, it allows the webbing to slip through to preserve it from any damage. Since the belt reel 20 is prevented from rotating via the control pawl 52, the control ring 48 and the supporting thereof on the clamping shoe 30 via the lever arms 42, 44, on further pulling over the webbing 28 due to the radially yieldable mounting of said reel the latter is moved in the direction of the blocking toothing 24, 26 in the openings of the side legs of the housing 14 until its blocking gears 16, 18 come into engagement with the blocking toothings 24, 26. The belt reel 20 is now blocked in loadbearing manner; the stresses going beyond the predetermined value at which the webbing 28 slips through between the clamping shoe 30 and clamping plate 32 are taken up via the belt reel 20 by the blocking toothings 24, 26.

In the safety belt restraining system according to the invention the clamping effect of the webbing clamping means 12 starts immediately after vehicle-sensitive or webbing-sensitive activation of the belt reel blocking mechanism. In the event of a vehicle collision the forward throw distance for the vehicle occupant is therefore a minimum. With increasing tensile force F in the webbing 28, due to the wedge form of the clamping shoe 30, the webbing compression between clamping shoe and clamping plate 32 is automatically intensified. By the matching of the sliding properties at the clamping faces of the clamping shoe 30 and the clamping plate 32 on the one hand and the webbing 28 on the other, it is ensured that on further increase of the tensile force F the webbing 28 slips through between the clamping shoe 30 and clamping plate 32 without being damaged. The slipping through of the webbing 28 is however initially only over a few millimetres which suffice to drive the blocking gears 16, 18 of the belt reel 20 into the blocking toothings 24, 26. The subsequently occurring film-reel effect, which possibly permits a further webbing withdrawal of a few millimetres up to a maximum of a few centimetres, results in a decrease of load peaks in the webbing system and is therefore desirable.

Figure 4:
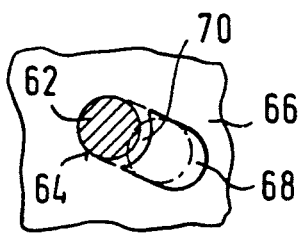
FIG. 4 is a schematic detail view of a first embodiment of the mounting of a belt reel.

In the variant of a radially yieldable mounting of the belt reel shown in FIG. 4 said reel is provided at one end with a cylindrical bearing extension 62 which is received in a matching opening 64 of a housing cover 66 of resiliently yieldable plastic material. Towards the side of the blocking toothing 24 or 26 the housing cover 66 placed on the housing 14 is provided with a cutout 68. The wall portion 70 between said cutout 68 and the bearing opening 64 is weakened due to its dimensioning and initially first resiliently yields until, under higher load, it tears and allows the bearing extension 62 to enter the cutout 68.

Figure 5:
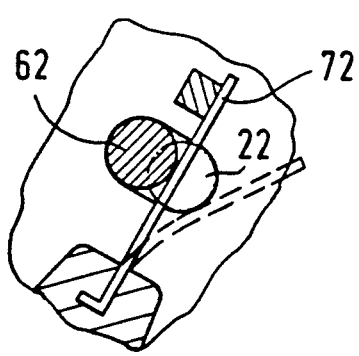
FIG. 5 shows a second embodiment of the mounting of a belt reel.

In the embodiment of a radially yieldable mounting of the belt reel shown in FIG. 5, the cylindrical bearing lugs 64 thereof are each received in a slot 22 of a housing cover. A leaf spring 72 fixedly clamped at one end thereof presses the respective adjacent bearing extension 64 against the one end of the slot 22. Within the slot 22 each bearing extension 64 is displaceable against the force of the leaf spring 72 u to the opposite end of the slot 22.

An advantageous embodiment of a webbing clamping means is shown schematically in FIG. 6. In this embodiment the clamping element consists of a cylindrical roller 80 which is undulated at its outer periphery or provided with a toothing gentle to the fabric, or may also be smooth. The roller 80 is rotatably mounted with radial clearance in the two oppositely disposed legs of a stirrup member 82. The base plate 84 of said stirrup member 82 forms a clamping plate analogous to the clamping plate 32 in the embodiment according to FIGS. 1 to 3. On its side remote from the webbing 28 the roller 80 bears on a support element 86 inclined to the longitudinal direction of the webbing 28. The stirrup member 82 comprises an end wall 88 on the outer surface of which an activating force A acts which can be applied via a lever arm like the lever arm 42 in the embodiment according to FIGS. 1 to 3. The clamping plate 84 is provided on its side remote from the roller 80 with a partially cylindrical cutout 90, by which its flexural strength is reduced. At a specific pressure, exactly known in advance, the clamping plate 84 yields in the region of its cutout 90 and assumes a bent state so that it gives way to the roller 80 and a further increase of the webbing application pressure is avoided. The webbing can therefore slip between the roller 80 and the face of the clamping plate 84 facing it.

Figure 9:
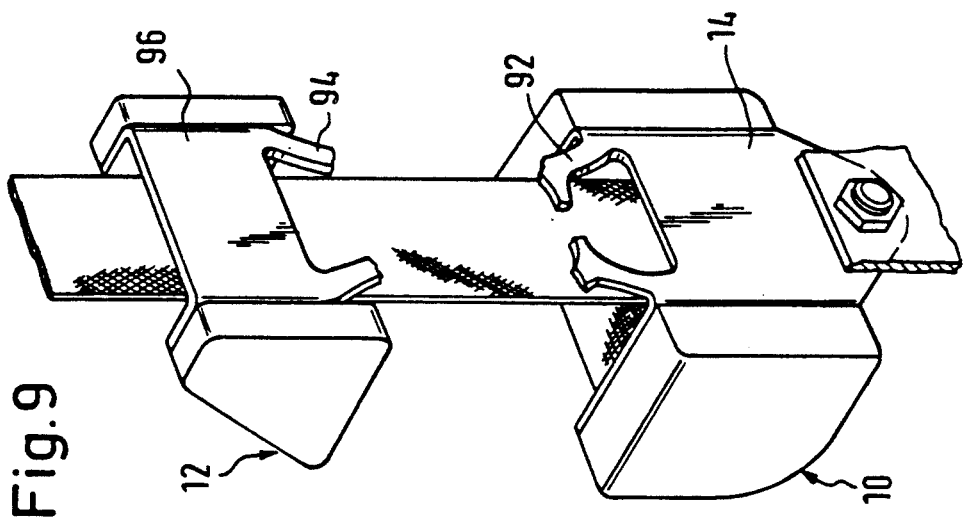
FIG. 9 shows the system illustrated in FIG. 8 after a further high load.
Figure 8:
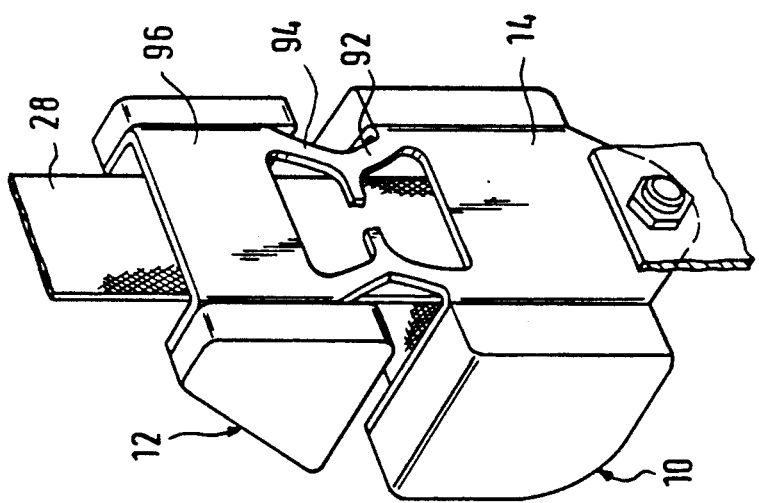
FIG. 8 shows the system illustrated in FIG. 7 after occurrence of an increased load.
Figure 7:
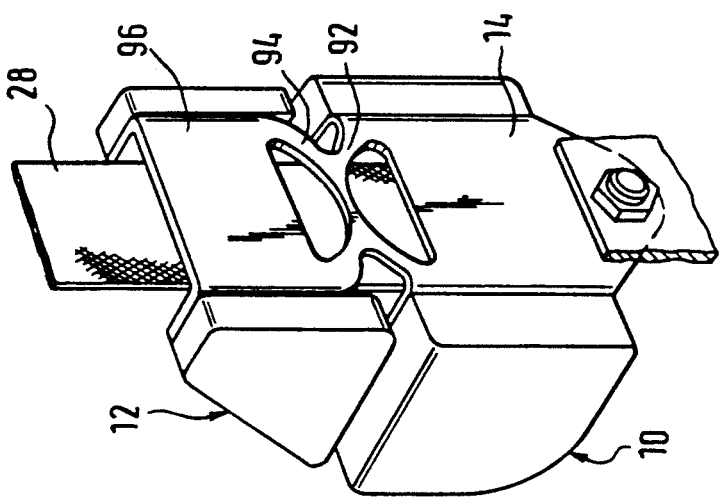
FIG. 7 is a perspective view of a belt retractor and a clamping means connected thereto in the state before occurrence of a high load.

In the embodiment according to FIGS. 7, 8 and 9 the housing 14 of the belt retractor is connected via an arcuate web 92 to an oppositely bent web 94 of the housing 96 of the webbing clamping means. The webs 92, 94 are fused together at their apices and connected at their free ends respectively to the associated housing. The width of the arcuate legs 92, 94 is smallest in the region of their apex so that a desired breaking point is created. When the predetermined value is reached, up to which the webbing blocking is to be effected solely by the webbing clamping means, the webs 92, 94 begin to plastically deform. The housings 14, 96 move away from each other. From a predetermined load value onwards the webs 92, 94 tear off at their joint point in the region of their apex. The remaining web portions are further stretched until for instance the state shown in FIG. 8 is reached. The distance D through which the two housings 14, 96 have moved apart from each other suffices to move the blocking gears 16, 18 of the belt reel 20 into engagement with the housing-fixed blocking toothings 24, 26. During the plastic deformation of the webs 92, 94 work is done, i.e. energy is absorbed, and as a result load peaks in the belt system are reduced in desirable manner. A complete tearing off of the webs 92, 94, as shown in FIG. 9, is not detrimental if the belt retractor 10 is dimensioned robust enough to be able to take up the entire blocking load.

The preferred embodiment according to FIGS. 10 and 11 differs from that according to FIGS. 7, 8 and 9 in that the housings 14 and 96 are connected together by connecting means adapted to shear off, in particular shearing pins 98. FIG. 10 shows the state before an accident loading and FIG. 11 after an accident loading at which the predetermined value for which the shearing pins 98 are dimensioned was exceeded. Furthermore, in this embodiment the clamping faces of the clamping shoe 30 and clamping plate 32 are made with a toothing to increase the clamping force which can be reached without causing any damage to the webbing.

I claim:

1. A safety belt restraining system comprising:
    a seat belt retractor including a belt reel on which seat belt webbing is wound and from which the belt webbing may be unwound in a belt withdrawal direction;
    seat belt webbing clamping means located adjacent said retractor in the belt withdrawal direction for clamping the belt webbing when a tension load of a first predetermined magnitude is applied to the belt webbing and for holding the belt webbing from movement in the belt withdrawal direction until the tension load in the belt webbing exceeds a second predetermined magnitude which is greater than said first predetermined magnitude; and
    said belt retractor including blocking means responsive to movement of the belt webbing in the belt withdrawal direction and relative to said webbing clamping means for blocking movement of the belt webbing in the belt withdrawal direction and relative to said webbing clamping means when the tension load in the belt webbing exceeds said second predetermined magnitude.

2. A safety belt restraining system according to claim 1 wherein said second predetermined magnitude lies in a range of about 6,000N to 12,000N.

3. A safety belt restraining system according to claim 1 wherein said webbing clamping means includes opposed clamping faces between which the belt webbing slips through when the tension load in the belt webbing exceeds said second predetermined magnitude.

4. A safety belt restraining system according to claim 3 wherein said webbing clamping means includes a roller-shaped clamping element.

5. A safety belt restraining system according to claim 4 wherein said webbing clamping means includes a clamping plate on which one of said clamping faces is formed and which yields when the tension load in the belt webbing reaches said second predetermined magnitude, said one clamping face being located opposite said roller-shaped clamping element.

6. A safety belt restraining system according to claim 5 wherein said clamping plate is arranged at a base of a stirrup member which has a pair of legs, said roller-shaped clamping element being rotatably mounted with radial clearance between said legs.

7. A safety belt restraining system according to claim 1 wherein said belt retractor includes a housing and said belt reel is mounted radially yieldable in said housing of said belt retractor.

8. A safety belt restraining system according to claim 7 wherein said housing of said belt retractor has blocking toothrings and said belt reel includes blocking gears which cooperate with corresponding blocking toothrings on said housing of said belt retractor.

9. A safety belt restraining system according to claim 1 wherein said belt retractor includes a control pawl activatable in vehicle-sensitive and/or webbing-sensitive manner and mounted on said belt reel of said belt retractor, said control pawl cooperating with a control ring surrounding said control pawl and having an internal toothing, said webbing clamping means being activatable by limited rotation of said control ring.

10. A safety belt restraining system according to claim 9 wherein said webbing clamping means includes a movable clamping element and said control ring includes an actuating lug which presses onto said movable clamping element of said webbing clamping means.

11. A safety belt restraining system according to claim 1 further including connecting means connecting said webbing clamping means and said belt retractor for yielding with plastic deformation and allowing a limited movement of said webbing clamping means away from said belt retractor when the tension load in the belt webbing reaches said second predetermined magnitude.

12. A safety belt restraining system comprising:
    a seat belt retractor including a belt reel on which seat belt webbing is wound and from which the belt webbing may be unwound in a belt withdrawal direction, said belt retractor including a loadbearing housing;
    seat belt webbing clamping means located adjacent said retractor in the belt withdrawal direction for clamping the belt webbing when a tension load of a first predetermined magnitude is applied to the belt webbing and for holding the belt webbing from movement in the belt withdrawal direction until the tension load in the belt webbing exceeds a second predetermined magnitude which is greater than said first predetermined magnitude, said webbing clamping means including a loadbearing housing;

said belt retractor including blocking means responsive to movement of the belt webbing in the belt withdrawal direction and relative to said webbing clamping means for blocking movement of the belt webbing in the belt withdrawal direction and relative to said webbing clamping means when the tension load in the belt webbing exceeds said second predetermined magnitude;

connecting means connecting said webbing clamping means and said belt retractor for yielding with plastic deformation and allowing a limited movement of said webbing clamping means away from said belt retractor when the tension load in the belt webbing reaches said second predetermined magnitude; and said connecting means including deformable webs interconnecting said loadbearing housing of said belt retractor and said loadbearing housing of said webbing clamping means.

13. A safety belt restraining system according to claim 12 wherein said deformable webs are arcuate and are connected to adjacent housing ends, said deformable webs being joined together at their apices in a region susceptible of breaking after the tension load in the belt webbing exceeds said second predetermined magnitude.

14. A safety belt restraining system comprising:

a seat belt retractor including a belt reel on which seat belt webbing is wound and from which the belt webbing may be unwound in a belt withdrawal direction, said belt retractor including a housing;

seat belt webbing clamping means located adjacent said retractor in the belt withdrawal direction for clamping the belt webbing when a tension load of a first predetermined magnitude is applied to the belt webbing and for holding the belt webbing from movement in the belt withdrawal direction until the tension load in the belt webbing exceeds a second predetermined magnitude which is greater than said first predetermined magnitude, said webbing clamping means including a housing;

said belt retractor including blocking means responsive to movement of the belt webbing in the belt withdrawal direction and relative to said webbing clamping means for blocking movement of the belt webbing in the belt withdrawal direction and relative to said webbing clamping means when the tension load in the belt webbing exceeds said second predetermined magnitude; and connecting means interconnecting said housing of said belt retractor and said housing of said webbing clamping means for yielding and allowing a separation of said housings from each other after the tension load in the belt webbing exceeds said second predetermined magnitude.

15. A safety belt restraining system according to claim 14 wherein said connecting means is formed by elements adapted to be sheared off.

* * * * *

UNITED STATES PATENT AND TRADEMARK OFFICE
CERTIFICATE OF CORRECTION

PATENT NO. : 5,242,213
DATED : September 7, 1993
INVENTOR(S) : Artur Fohl

It is certified that error appears in the above-indentified patent and that said Letters Patent is hereby corrected as shown below:

Column 6, line 38, change "toothrings" to --toothings--.

Column 6, line 39, change "toothr-" to --tooth---.

Signed and Sealed this

Twenty-ninth Day of March, 1994

Attest:

BRUCE LEHMAN

Attesting Officer        Commissioner of Patents and Trademarks